United States Patent
Nakagawa et al.

(12) 
(10) Patent No.: US 6,204,870 B1
(45) Date of Patent: Mar. 20, 2001

(54) IMAGE FORMATION APPARATUS CONTROL BY MEASUREMENT OF IMAGE PATTERNS HAVING DIFFERENT EMISSION RISING CHARACTERISTICS

(75) Inventors: Kenichi Nakagawa, Mishima; Kazuo Suzuki, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/391,517

(22) Filed: Sep. 8, 1999

(30) Foreign Application Priority Data

Sep. 8, 1998 (JP) .................................................. 10-253919
Sep. 25, 1998 (JP) .................................................. 10-271582

(51) Int. Cl.[7] .............................. B41J 2/385; G03G 13/04
(52) U.S. Cl. .............................................................. 347/133
(58) Field of Search ................................... 347/133, 233, 347/236, 237, 246, 247

(56) References Cited

U.S. PATENT DOCUMENTS

| 4,751,394 | 6/1988 | Matsuoka et al. | 250/561 |
| 4,977,414 | * 12/1990 | Shimada et al. | 347/247 |
| 5,949,468 | * 9/1999 | Asahina et al. | 347/246 |

FOREIGN PATENT DOCUMENTS

| 56-105686 | 8/1981 | (JP) . |
| 7-319086 | 12/1995 | (JP) . |

* cited by examiner

Primary Examiner—Susan S. Y. Lee
(74) Attorney, Agent, or Firm—Fitzpatrick, Cella, Harper & Scinto

(57) ABSTRACT

Plural lines on a surface of a photosensitive body of an electrophotographic image formation apparatus are simultaneously scanned by plural laser beams for image formation. Each of a pair of semiconductor lasers $11a$ and $11b$ biased in an ON state is independently turned on. A surface potential of the photosensitive body in each case is measured by a measurement unit such as a surface potential sensor 30, a surface potential detection circuit 31 and an A/D conversion circuit 32. Based on the measured result, an operational current of each laser is determined by a CPU 33 such that the surface potential of the photosensitive body becomes a target-potential, e.g., 220V to 230V. An image pattern difficult to be influenced by the laser start characteristic and an image pattern easy to be influenced by the laser start characteristic are formed, and the formed image patterns are respectively measured so that the current supplied at no beam emission time is controlled according to the measured results.

11 Claims, 15 Drawing Sheets

FIG. 7

| THE NUMBER OF GRADATIONS | SEMICONDUCTOR LASER | |
|---|---|---|
| | 11a | 11b |
| 0 | 0 | 0 |
| 1 | 13 | 14 |
| 2 | 20 | 23 |
| 3 | 32 | 37 |
| 4 | 44 | 47 |
| 5 | 50 | 54 |
| 6 | 60 | 66 |
| 7 | 70 | 76 |
| 8 | 80 | 84 |
| 9 | 90 | 95 |
| 10 | 9d | a6 |
| 11 | ac | b4 |
| 12 | b9 | c4 |
| 13 | cb | d3 |
| 14 | d9 | e1 |
| 15 | e8 | f0 |

IMAGE FORMATION APPARATUS CONTROL BY MEASUREMENT OF IMAGE PATTERNS HAVING DIFFERENT EMISSION RISING CHARACTERISTICS

BACKGROUND OF THE INVENTION

1. Field of the Invention

The present invention relates to an image formation apparatus which forms an image onto a photosensitive body by using a light source.

2. Related Background Art

In a digital image formation apparatus such as a copying machine, a printer or the like which adopts electrophotographic techniques, light corresponding to an original image is irradiated by a light source such as a laser or the like onto a photosensitive layer on the surface of a photosensitive body uniformly charged by a charger utilizing corona discharge or the like, whereby an electrostatic latent image is formed on the photosensitive body. Recently, the apparatus which uses a semiconductor laser as the light source has been widely used. In a latent image formation process, a laser beam is initially collimated by a lens, and the collimated beam is irradiated onto a rotating polygonal mirror, whereby the laser beam scans the surface of the photosensitive body along a photosensitive body axis direction by the rotation of the polygonal mirror. A thus formed electrostatic latent image is applied with toner by a development unit, whereby the latent image on the photosensitive body is visualized. Then such a toner image is transferred onto a sheet member by a transfer unit. The toner image transferred onto the sheet member is heated, pressed and fixed thereto by a fixing unit. On the photosensitive body posterior to the image transfer, the toner not transferred to the sheet member is eliminated by a cleaning unit, and then the residual electrostatic latent image on the body is also eliminated by light irradiation with a pre-exposure device.

In the digital image formation apparatus which uses such a laser beam, rotational speed of the polygonal mirror has been recently become faster and a multi-beam laser or the like has been recently applied, so that process speed of the apparatus itself has increased. Such increase in the process speed naturally needs an increase in laser rise time speed (i.e., switching response speed). If the laser rise time speed is insufficient, the following disadvantages arise when a binary printer is used for image printing. For example, roughness occurs at a highlight portion, and a fine line or hair stroke is not clearly reproduced.

In order to eliminate such disadvantages, a method has been proposed to always supply a certain quantity of DC current from a laser drive circuit to the laser to improve start of beam emission (i.e., laser ON).

However, such a conventional technique includes the following drawbacks.

As to the potential on the surface of the photosensitive body, a potential difference between the portion corresponding to solid black and the portion corresponding to solid white in a reversal process system (i.e., difference between dark potential and light potential) is generally made as larger as possible so as to improve intent image intensification. For this reason, especially, the apparatus which uses the photosensitive body mainly made of amorphous silicon having relatively low charging capability exposes the portion corresponding to the solid white as little as possible. Namely, in such apparatus, it is desirable to control a current value to be lower than a threshold from which laser beam resonant emission is started, in order to lower a laser beam emission quantity as much as possible. However, there is dispersion in laser characteristics, and there is dispersion also in the identical laser drive circuits controlling currents to be supplied to the laser. Therefore, if the laser current value is determined as one value, a certain apparatus emits the laser beam even at the solid white portion, and, in a certain other apparatus, the laser start speed is delayed. These drawbacks finally cause dispersion in printer characteristics. However, even if the dispersion in every laser characteristic and the dispersion in every laser drive circuit are measured to adjust the current value, it causes increases in cost and manufacturing time.

Further, since operational speed of the image formation apparatus has become faster in recent years, a method in which plural lines are written by using a twin-beam laser capable of simultaneously emitting two laser beams or a laser array consisting of plural laser diodes has been applied to cope with such the fast operational speed.

In the image formation apparatus which uses such plural laser beams, than applied a method disclosed in Japanese Patent Application Laid-Open No. 56-105686 wherein light leaked rearward from each laser diode is detected by using a monitor laser diode, and based on such a detected signal a light quantity of each laser diode is controlled to be equal to others.

Further, in such image formation apparatus, there is also applied a method disclosed in Japanese Patent Application Laid-Open No. 07-319086 in which light quantity distribution of the beam emitted from each laser diode is detected by using a light quantity distribution measurement means, and based on such a detected signal, the exposure quantity of each laser diode is controlled such that the width of a light quantity distribution curve of an effective lower-limit exposure quantity of each laser beam becomes equal to others. Further, in a case where a latent image is formed by each laser beam, the formed latent image is transferred onto a surface of a photosensitive body or a sheet member, and the transferred image is then visualized by using toner. There is also applied a method wherein the density of the visualized image is measured by a density measurement unit, and based on such a measured signal, the exposure quantity of each laser diode is controlled.

However, in the above conventional image formation apparatuses, there were following problems.

That is, in the method as disclosed in Japanese Patent Application Laid-Open No. 56-105686 in which the light leaked rearward from each laser diode is detected by using the monitor laser diode, and based on such detected signal, the light quantity of each laser diode is controlled to be equal to others, and in the method as disclosed in Japanese Patent Application Laid-Open No. 07-319086 wherein the light quantity distribution of the beam emitted from each laser diode is detected by using the light quantity distribution measurement unit, and based on such the detected signal the exposure quantity of each laser diode is controlled such that the width of the light quantity distribution curve of the effective lower-limit exposure quantity of each laser beam becomes equal to others. Differences among respective optical paths extended from emission points of the plural laser beams to the surface of the photosensitive body are not taken into consideration. Therefore, there is some fear that the light quantity on the surface of the photosensitive body can not be correctly controlled.

Further, the light quantity distribution measurement unit and the density measurement unit respectively used in the methods as disclosed in Japanese Patent Application Laid-Open No. 07-319086 cause an increase in cost.

SUMMARY OF THE INVENTION

The present invention has been made to solve the above-described problems, and an object thereof is to correctly prevent image deterioration due to differences among light quantities of plural lasers by a simple and cost-effective structure in a case where plural lines are simultaneously exposed by scanning of plural laser beams to perform image formation.

Another object of the present invention is to lower image deterioration due to a laser start characteristic as much as possible, and especially to realize high-speed image formation without degrading highlight reproducibility and fine line reproducibility.

Still another object of the present invention is to judge whether or not a drive current supplied before laser beam emission time invites image deterioration due to the laser start characteristic.

To achieve the above objects, the present invention provides an image formation apparatus comprising:

emission means for driving plural light beams modulated based on image information;

measurement means for independently driving each of the plural light beams to measure a surface potential of an irradiated photosensitive body; and control means for independently controlling a drive condition of each of the plural light beams on the basis of the measured result.

Further, the present invention provides a control method of an image formation apparatus which irradiates plural light beams onto a photosensitive body to form an image, the method comprising:

a drive step of independently driving each of the plural light beams;

a measurement step of measuring a surface potential of the irradiated photosensitive body; and a control step of independently controlling a drive condition of each of the plural light beams on the basis of the measured result.

Further, the present invention provides an image formation apparatus which irradiates a light beam onto a photosensitive body to form an image on the photosensitive body, comprising:

emission means for emitting the light beam modulated according to image information;

first means for causing the emission means to form an image pattern which is difficult to be influenced by a start characteristic of the emission means;

second means for causing the emission means to form an image pattern which is easy to be influenced by the start characteristic of the emission means;

measurement means for respectively measuring the image patterns formed by the first means and the second means; and control means for controlling image formation conditions according to the respective measured results of the measurement means.

Further, the present invention provides a control method of an image formation apparatus which irradiates a light beam onto a photosensitive body to form an image on the photosensitive body, the method comprising:

a first step of forming, by using the light beam, an image pattern which is difficult to be influenced by a start characteristic of the light beam;

a second step of forming, by using the light beam, an image pattern which is easy to be influenced by the start characteristic of the light beam;

a measurement step of respectively measuring the image patterns formed in the first step and the second step; and a control step of controlling image formation conditions according to the respective measured results in the measurement step.

Further, the present invention provides a control method of an image formation apparatus which irradiates a light beam onto a photosensitive body to form an image on the photosensitive body, the method comprising:

a first step of forming, by using the light beam, an image pattern which is difficult to be influenced by a start characteristic of the light beam;

a second step of forming, by using the light beam, an image pattern which is easy to be influenced by the start characteristic of the light beam; and a measurement step of respectively measuring the image patterns formed in the first step and the second step.

Other objects and features of the present invention will become apparent from the following detailed description and the attached drawings.

BRIEF DESCRIPTION OF THE DRAWINGS

FIG. 7 is a view showing a pulse width correction according to the second embodiment;

DETAILED DESCRIPTION OF PREFERRED EMBODIMENTS

Hereinafter, the embodiments of the present invention will be explained with reference to the accompanied drawings.

(First Embodiment)

Figure 1:
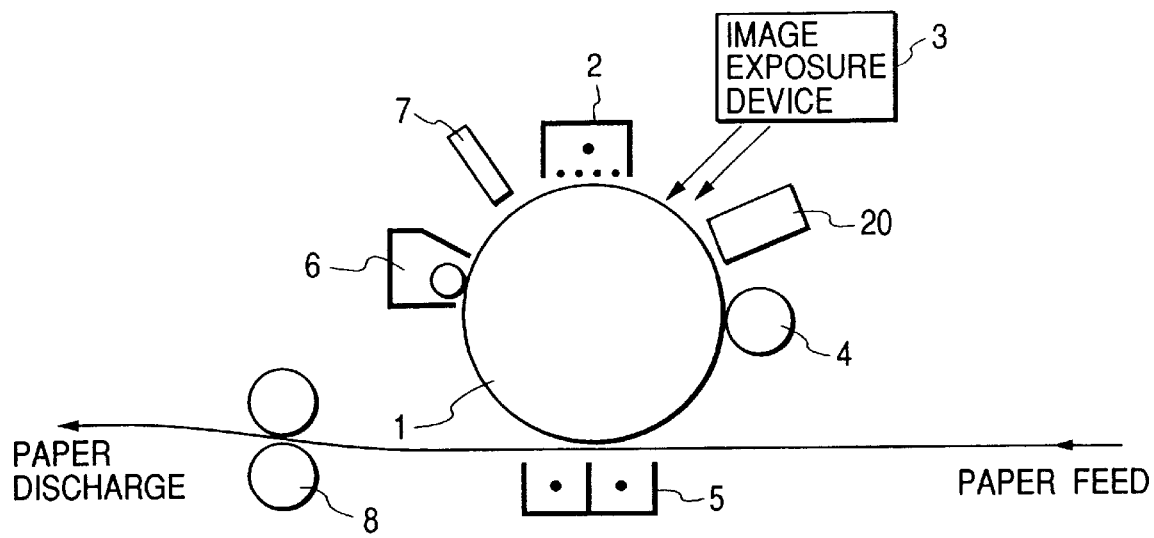
FIG. 1 is a view showing a structure of the main part of an image formation apparatus according to the first embodiment of the present invention.

FIG. 1 is a view showing a structure of the main part of an image formation apparatus according to the first embodiment of the present invention.

In FIG. 1, numeral 1 denotes a photosensitive body which is mainly made of drum-type amorphous silicon and rotatively driven clockwise, and numeral 2 denotes a primary charger. Numeral 3 denotes an image exposure device which irradiates by using two semiconductor lasers an image beam (or image light) corresponding to an image obtained by binarizing a multivalue image signal at 600DPI (dots per inch) through an error diffusion method with a not-shown image process unit.

Numeral 4 denotes a development device, numeral 5 denotes a transfer and separation device, numeral 6 denotes a cleaning device, numeral 7 denotes a pre-exposure device, numeral 8 denotes a fixing device, and numeral 20 denotes a surface potentiometer (i.e., potential measurement means) which measures a potential on the surface of the photosensitive body. The image formation apparatus in the present embodiment adopts a reversal process system. In this system, toner is adhered by the development device 4 to the portions exposed by the image exposure device 3, whereby a latent image is visualized as a toner image. The toner image is transferred onto a sheet member by the transfer and separation device 5, and then heated, pressed and fixed to the sheet member by the fixing device 8.

Figure 2:
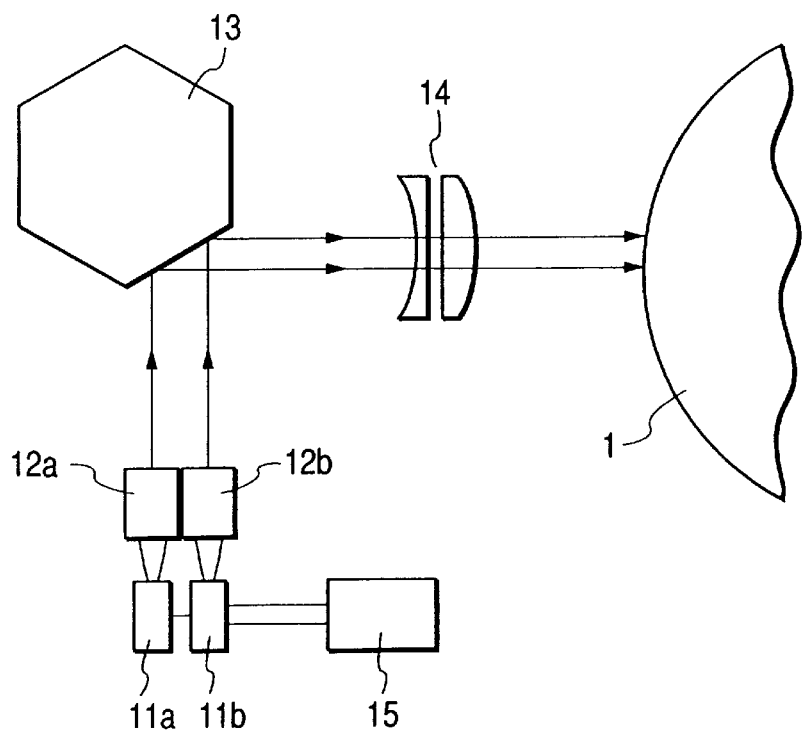
FIG. 2 is a view for explaining a structure of an image exposure device 3 shown in FIG. 1.

FIG. 2 is a view for explaining the structure of the image exposure device 3 shown in FIG. 1. As shown in FIG. 2, the image exposure device 3 is composed of semiconductor lasers 11a and 11b, a collimator lens 12, a polygonal mirror 13, an f-θ lens 14, and a laser drive circuit 15. The laser drive circuit 15 turns on and off the lasers 11a and 11b on the basis of a printing signal supplied from a not-shown image process unit. In a case where an optical system is aligned such that a spot diameter of each laser beam on the surface of the photosensitive body is identical with others, it has been known that the spot diameter hardly ever changes even after long-running use of the image formation apparatus. In the present embodiment, it should be noted that an amorphous silicon photosensitive layer of which total thickness is 30 μm or so is used as the photosensitive body.

In a case where the potential on the surface of the photosensitive body after charging of the primary charger 2 is set to about 400V in the image formation apparatus, if the surface of the photosensitive body after the charging is exposed in the state that the semiconductor lasers 11a and 11b are always on, the relation between the total laser beam quantity and a decrease in potential due to light irradiation (i.e., photosensitive body sensitivity characteristic for light quantity) is substantially linear until the surface potential of the photosensitive body becomes about 40V. However, in this case, the laser output is adjusted such that the light quantities of the two lasers on the photosensitive body are always equal to each other. If the light quantities of the two lasers on the photosensitive body are always equal to each other, the target potential on the surface of the photosensitive body is set to 50V. At this time, the potential in case of turning on only one laser is about 220V to 230V.

Hereinafter, a laser output control method by the above structure according to the present invention will be explained. In the image formation apparatus of the above structure, the potential on the surface of the photosensitive body after the charging of the primary charger 2 is set to about 400V. Then the current of the identical initial setting value is applied to the semiconductor lasers 11a and 11b by the laser drive circuit 15 to turn on these lasers 11a and 11b respectively, and the surface potential of the photosensitive body is measured by the surface potentiometer 20. As a result, the surface potential of the photosensitive body is 240V when only the laser 11a is turned on, while the surface potential is 200V when only the laser 11b is turned on. In this case, uneven or irregular pitch corresponding to 300LPI (line per inch) in a sub scanning direction appears in the image on the sheet member after the development.

That is, it has been experimentally known that, if the difference between these potentials exceeds 40V, the uneven pitch corresponding to 300LPI in the sub scanning direction due to such the potential difference appears in the solid black image. Further, the width of the line extending in a main scanning direction corresponding to the one dot width in the sub scanning direction in case of turning on only the laser 11a is larger by 20% or so as compared with that in the case of turning on only the laser 11b.

However, in a case where the current applied from the laser drive circuit 15 to the semiconductor lasers 11a and 11b is adjusted to turn on these lasers 11a and 11b respectively, if the surface potential is set to be within the range of 220V to 230V, the uneven pitch corresponding to 300LPI in the sub scanning direction does not appear in the image on the sheet member after the development. Further, the width of the line extending in the main scanning direction corresponding to the one dot width in the sub scanning direction in case of turning on only the laser 11a becomes substantially identical with that in the case of turning on only the laser 11b, so that the image deterioration due to the difference in the laser beam quantities on the surface of the photosensitive body can be prevented.

Further, there are slight differences in peak positions of wavelength distributions and distribution bands between the semiconductor lasers 11a and 11b. Therefore, in some cases, even if the light quantity on the surface of the photosensitive body is adjusted before the above adjustment of the currents, latent image potentials by the respective lasers are not coincident with each other due to a spectral sensitivity characteristic of the photosensitive layer. However, after the difference of the surface potentials is made smaller by the above adjustment or control, the difference in the line widths between the respective lasers does not appear.

In the above case, the surface potential of the photosensitive body is measured, and the current to flow in each laser is manually adjusted such that the measured surface potential is within the range of 220V to 230V, thereby controlling the laser output. Such adjustment and control may be performed at a time of product shipment or periodic maintenance checkup.

Subsequently, a case where the above control is automatically performed will be explained.

Figure 3:
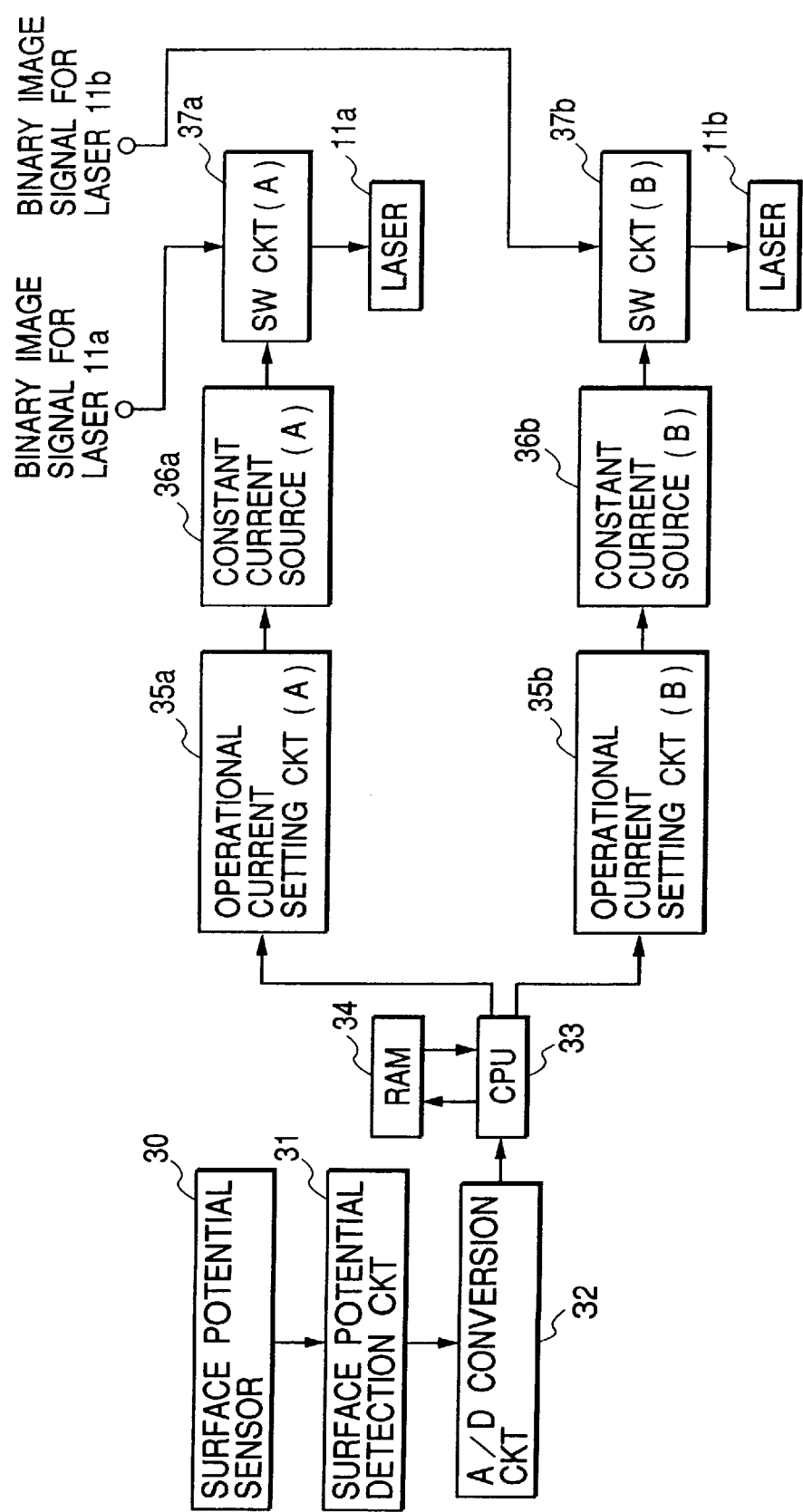
FIG. 3 is a block diagram showing a laser output control structure according to the first embodiment.

FIG. 3 is a block diagram showing a laser output control structure in the image formation apparatus. In FIG. 3, numeral 30 denotes a surface potential sensor, numeral 31 denotes a surface potential detection circuit which detects the surface potential on the photosensitive body 1 in response to a signal from the sensor 30, and numeral 32 denotes an analog-to-digital (A/D) conversion circuit which converts the signal of the detected surface potential into a digital signal. It should be noted that the sensor 30 and the circuits 31 and 32 correspond to the surface potentiometer 20 shown in FIG. 1.

Numeral 33 denotes a central processing unit (CPU) which expands the digital surface potential signal obtained by the sensor 30 and the circuits 31 and 32 for a random access memory (RAM) 34 when one of the semiconductor lasers 11a and 11b is on (always in on state). Then the CPU 33 controls the operational current of each laser such that the surface potential is within the range of 220V to 230V.

For example, when only the laser 11a is on, the CPU 33 determines a set current value of an operational current setting circuit (A) 35a on the basis of the surface potential signal such that the surface potential is within the range of 220V to 230V. Then the CPU 33 causes a constant current source (A) 36a to generate the current of the set current value and causes a switching circuit (A) 37a to perform switching on the basis of the binary image signal from the laser 11a, thereby turning on the laser 11a. Similarly, the CPU 33 causes an operational current setting circuit (B) 35b, a constant current source (B) 36b and a switching circuit (B) 37b to turn on the laser 11b such that the surface potential is within the range of 220V to 230V.

It should be noted that the laser drive circuit 15 shown in FIG. 2 includes the operational current setting circuit (A) 35a, the operational current setting circuit (B) 35b, the constant current source (A) 36a, the constant current source (B) 36b, the switching circuit (A) 37a and the switching circuit (B) 37b.

Figure 4:
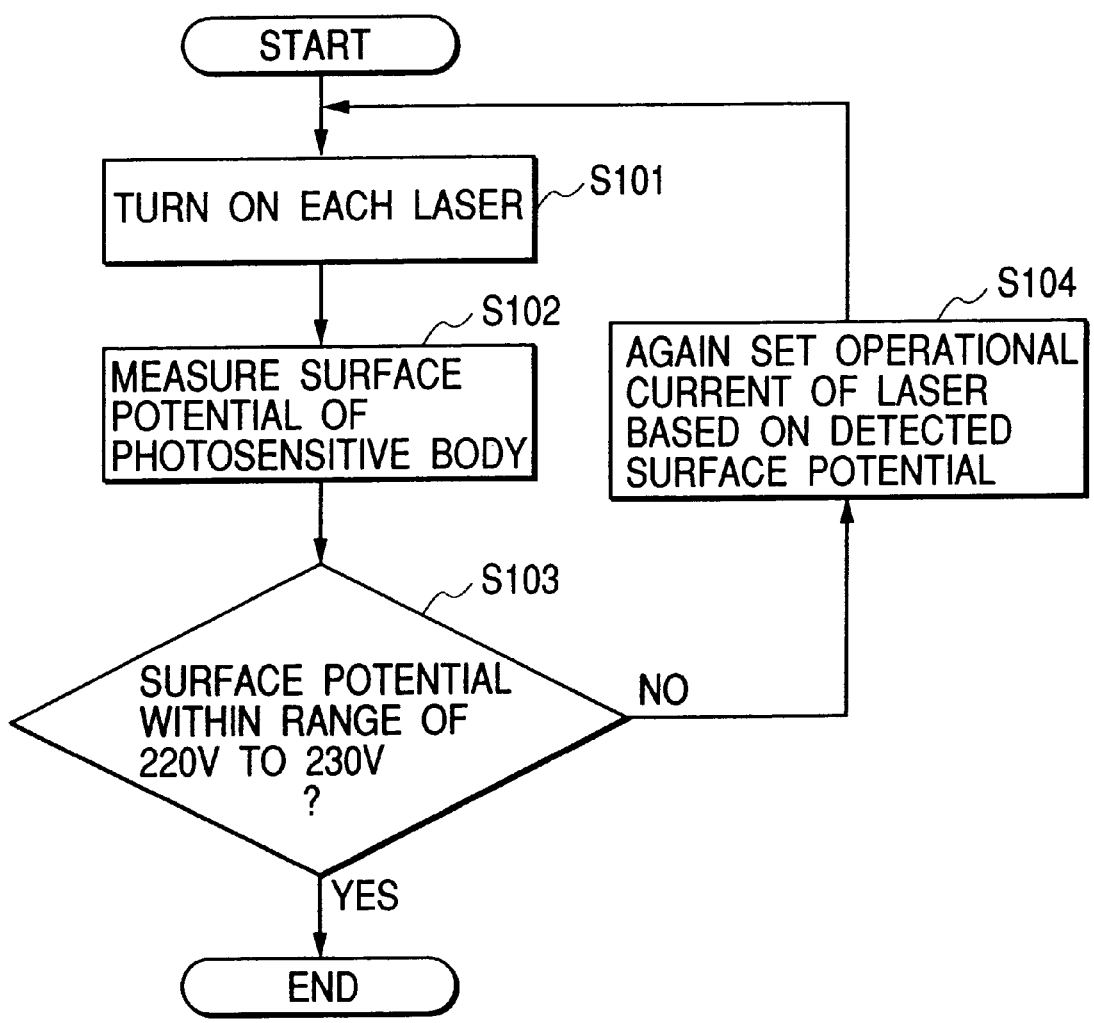
FIG. 4 is a flow chart showing a laser output control operation according to the first embodiment.

FIG. 4 is a flow chart showing the above laser output control operation according to the first embodiment. It should be noted that this operation is executed according to an instruction of the CPU 33, on the basis of a program stored in a not-shown read-only memory (ROM).

Initially, in a step S101, the current of the initial setting value is applied to each of the semiconductor lasers 11a and 11b to turn on each laser (always in on state). In a step S102, the surface potential of the photosensitive body 1 is detected, and then it is judged in a step S103 whether or not the surface potential is within the range of 220V to 230V. If judged that the surface potential is within the range of 220V to 230V, the operation ends. On the other hand, if judged that the surface potential exceeds such the range, the flow advances to a step S104 to again set the operational current value of the laser turned on by the CPU 33 on the basis of the detected surface potential. Thus, the laser is again turned on at the set operational current value. Such an operation is repeated until the surface potential comes to be within the range of 220V to 230V.

In the present embodiment, the surface potential of the photosensitive body is measured, and the current to be applied to each laser is automatically adjusted such that the measured surface potential is within the range of 220V to 230V, thereby controlling the laser output. Such adjustment and control may be performed at a power-on time in a case where the image formation apparatus is frequently used.

Further, in case of automatically controlling the laser output, such control may be realized as a storage medium for storing a program to do it.

As above, in the image formation apparatus according to the present embodiment which includes the primary charger (i.e., charging means) 2 for uniformly charging the photosensitive body at a predetermined potential, the laser drive circuit (i.e., signal generation means) 15 for generating the signal proportional to the density of the image to be formed, the image exposure device (i.e., exposure means) 3 for simultaneously exposing the plural lines by scanning an image support body with the plural collected laser beams to be able to form the electrostatic latent image in accordance with the signal from the circuit 15, and the development device (i.e., development means) 4 for obtaining the visible image by adhering the charged toner to the electrostatic latent image, the surface potential on the photosensitive body is measured when each laser is independently turned on, and the output of each laser is independently controlled such that the measured potential becomes the target potential. Thus, it is possible to optimally form the latent image by a simple and cost-effective method (or structure), thereby obtaining a high-quality image.

(Second Embodiment)

In the first embodiment, the case where the binary image obtained by binarizing the multivalue image density signal in the image process is formed as the latent image has been explained. In the second embodiment, an example in which a latent image is formed in a pulse-width modulation (PWM) system to realize more fine halftone reproduction will be explained. It should be noted that the structure of an image formation apparatus in the second embodiment is substantially the same as that of the image formation apparatus in the first embodiment explained in FIGS. 1 and 2, except for an operation of a not-shown image process unit.

In the not-shown image process unit in the present embodiment, a pulse width of a laser drive signal for each dot is modulated and controlled according to a four-bit (16 gradations) image signal of 600DPI. That is, the pulse width of the laser drive signal for one dot is large at a high-density portion, while the pulse width is small at a low-density portion. However, such pulse width can be modulated within the range of eight bits (256 values). Further, a photosensitive body 1 used in the present embodiment has the characteristic identical with that explained in the first embodiment.

Figure 5:
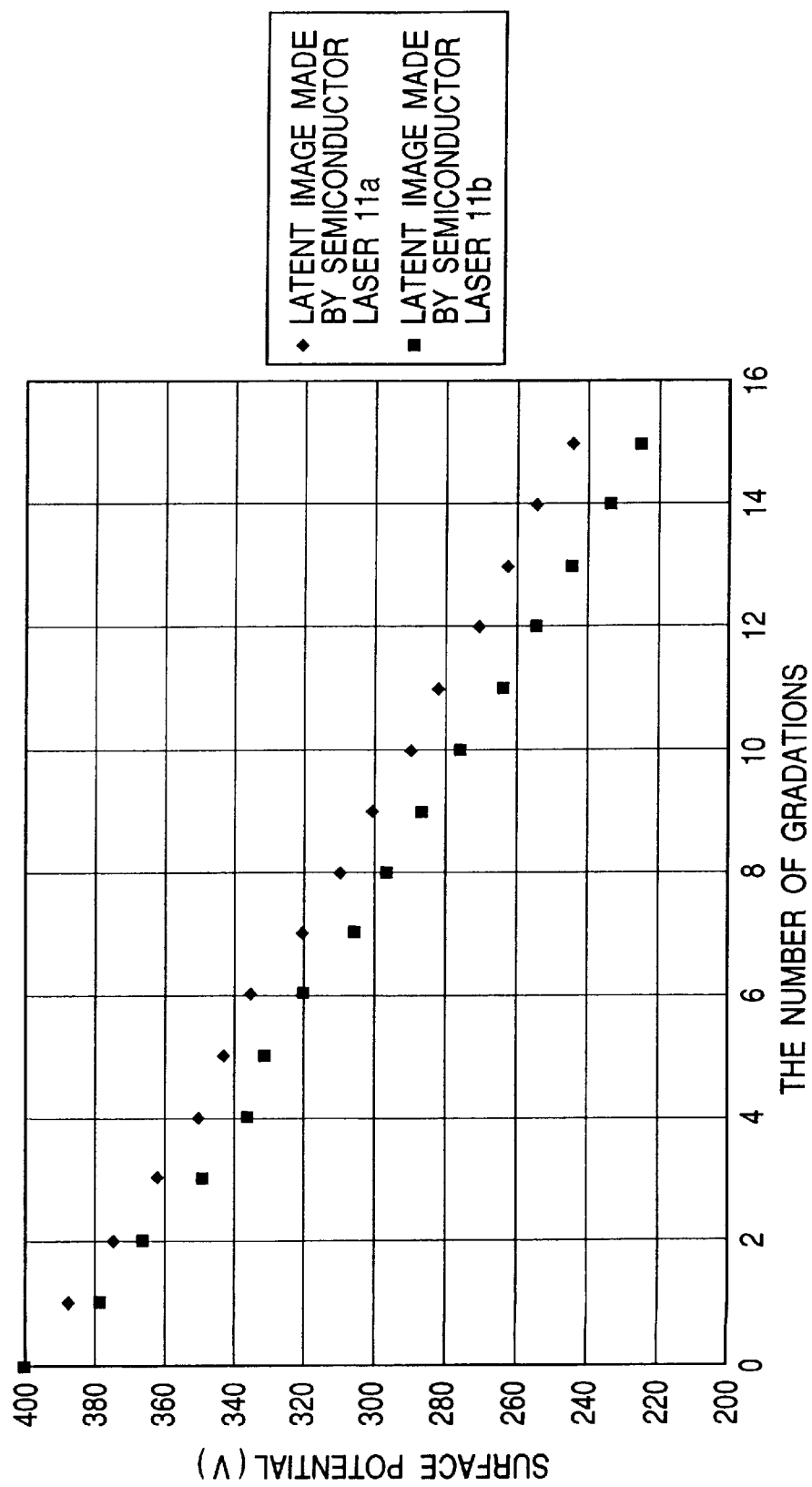
FIG. 5 is a view showing a photosensitive body surface potential of 16 gradations according to an initially set pulse width in the second embodiment.
Figure 6:
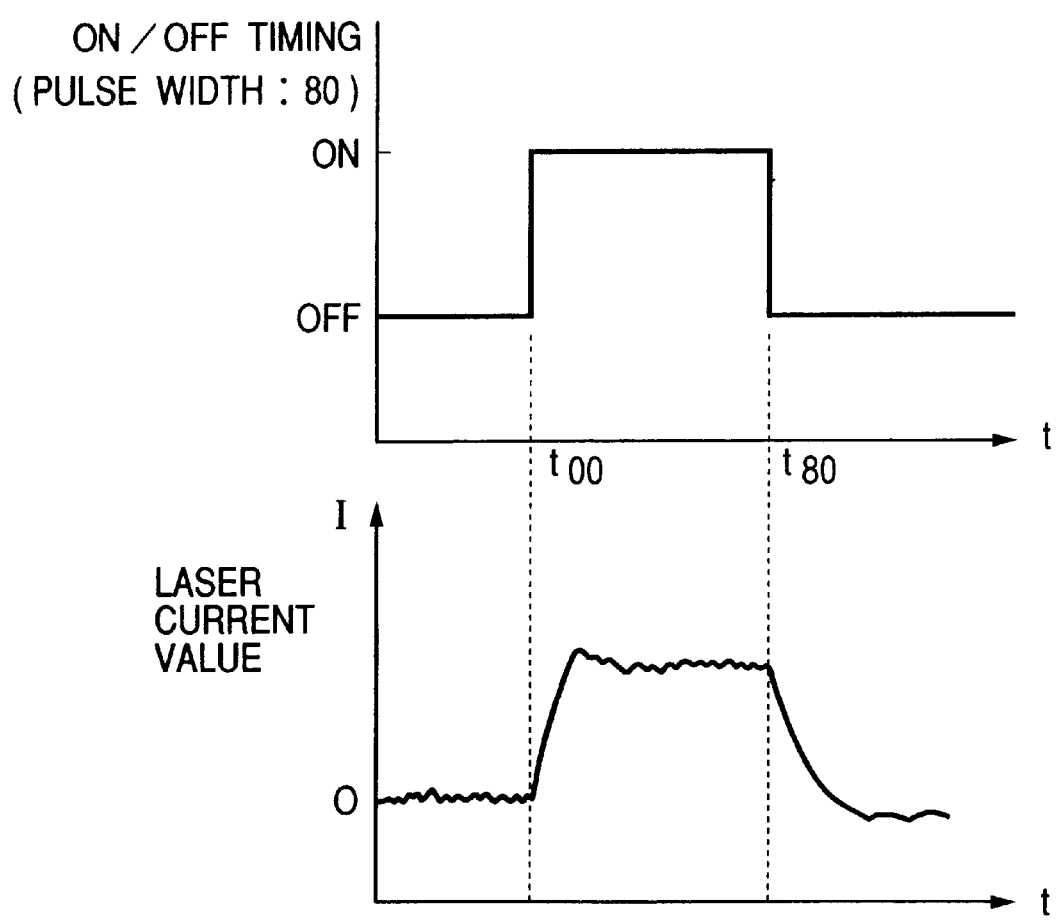
FIG. 6 is a view showing start and end characteristics of each laser.

Hereinafter, a laser output control method according to such a structure as above will be explained. A surface potential on the photosensitive body 1 after charging of a primary charger 2 is set to about 400V in the image formation apparatus having the above structure. Then a current of identical initial setting value is applied from a laser drive circuit 15 to semiconductor lasers 11a and 11b, to turn on the respective lasers with 16 gradation initial setting pulse widths 00, 10, 20, 30, 40, 50, 60, 70, 80, 90, a0, b0, c0, d0, e0 and f0 (ff is assumed as maximum pulse width of one pixel in hexadecimal), and the surface potential on the photosensitive body 1 is measured by a surface potentiometer 20. The surface potentials measured by the respective lasers are shown in FIG. 5. In the image which is formed on a sheet member after the 16 gradation patterns are developed with the initial setting pulse width, visible roughness is remarkable especially in the low-density portion. As the reason why the difference of the surface potentials on the photosensitive body by the lighting of the respective lasers appears and thus the visible roughness appears in the low-density portion of the image, following two points are suggested from FIG. 5. That is, (1) even if the currents to be applied to the respective lasers are identical with each other, the light quantities on the photosensitive body by the respective lasers are different from each other, and (2) for example, in case of the pulse width 80, start and stop characteristics of the respective lasers are different from each other as shown in FIG. 6.

Figure 8:
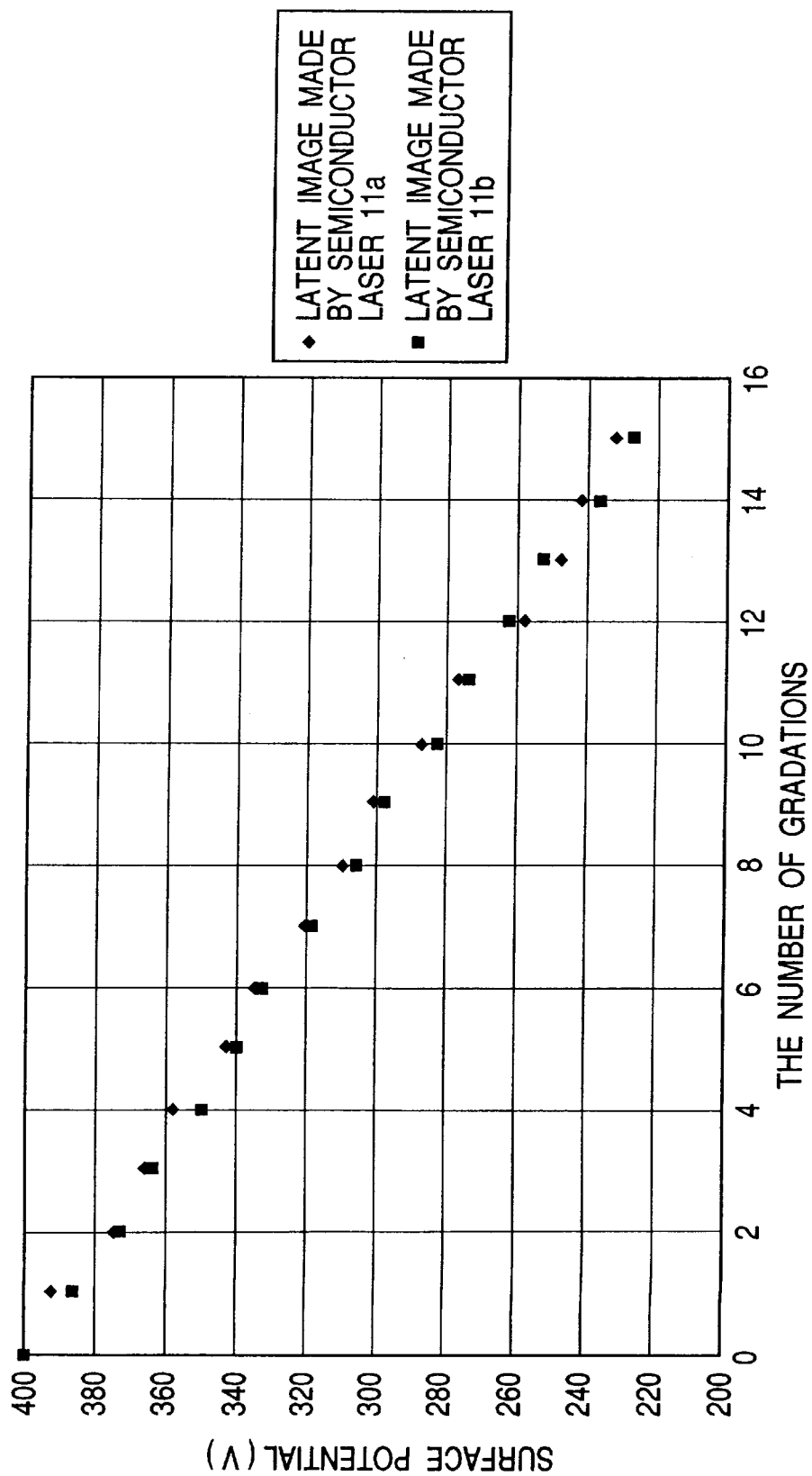
FIG. 8 is a view showing the photosensitive body surface potential of 16 gradations posterior to the pulse width correction according to the second embodiment.

Therefore, for example, if the pulse widths of the semiconductor lasers 11a and 11b are corrected as shown in FIG. 7, the differences of the surface potentials on the photosensitive body after the exposure by the respective lasers substantially disappear as shown in FIG. 8. Further, after the pulse widths are corrected, a high-quality image in which visible roughness is not remarkable even in the low-density portion can be obtained on the sheet member after the exposure.

In the above case, as the surface potential of the photosensitive body is measured, the pulse width of each laser is manually adjusted to control the laser output. Such control may be performed at a time of product shipment or periodic maintenance checkup.

Subsequently, a case where the above control is automatically performed will be explained.

Figure 9:
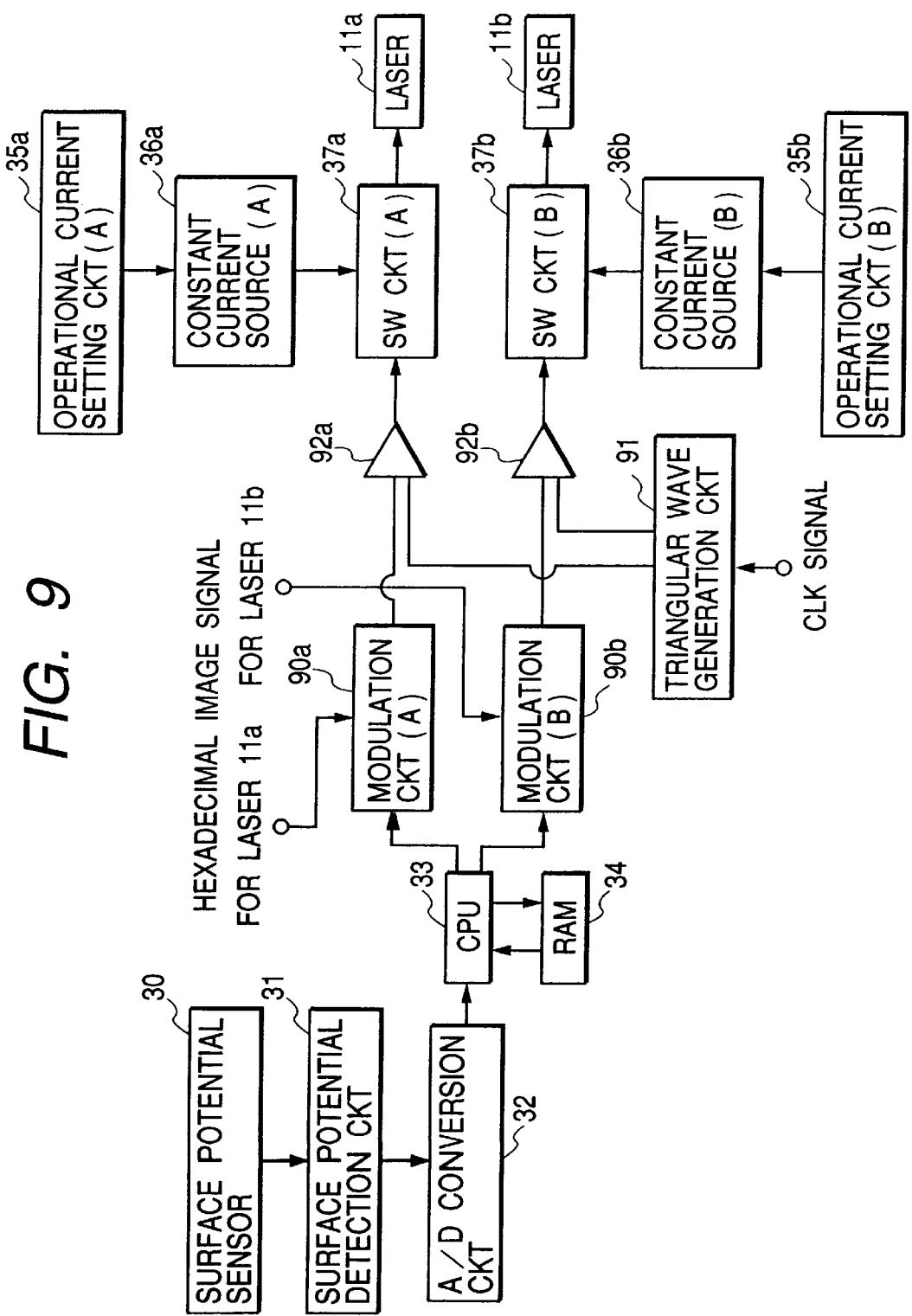
FIG. 9 is a block diagram showing a laser output control structure according to the second embodiment.

FIG. 9 is a block diagram showing a laser control structure according to the second embodiment. In FIG. 9, it should be noted that components having the same functions as those of the components in the first embodiment will be explained respectively with the same reference numerals as those shown in FIG. 3.

In FIG. 9, numeral 90a denotes a modulation circuit (A), and numeral 90b denotes a modulation circuit (B). The lasers are turned on with 16 gradation initial setting pulse widths, a look-up table (LUT) shown in FIG. 7 is formed by a CPU 33 on the basis of the potential measured results by a surface potential sensor 30, a surface potential detection circuit 31 and an A/D conversion circuit 32, the formed LUT is stored in a RAM 34, and then a hexadecimal image signal is input according to the stored LUT. In this case, the modulation circuits (A) 90a and (B) 90b perform modulation respectively.

The hexadecimal image signals modulated by the modulation circuits (A) 90a and (B) 90b are respectively compared with triangular wave (or chopping wave) signals from a triangular wave generation circuit 91 by comparators 92a and 92b on the basis of a clock (CLK) signal. Based on the compared results, switching of switching circuits (A) 37a and (B) 37b is performed, whereby currents generated from an operational current setting circuit (A) 35a, a constant current source (A) 36a, an operational current setting circuit (B) 35b and a constant current source (B) 36b are supplied as pulse currents respectively to the lasers 11a and 11b.

Figure 10:
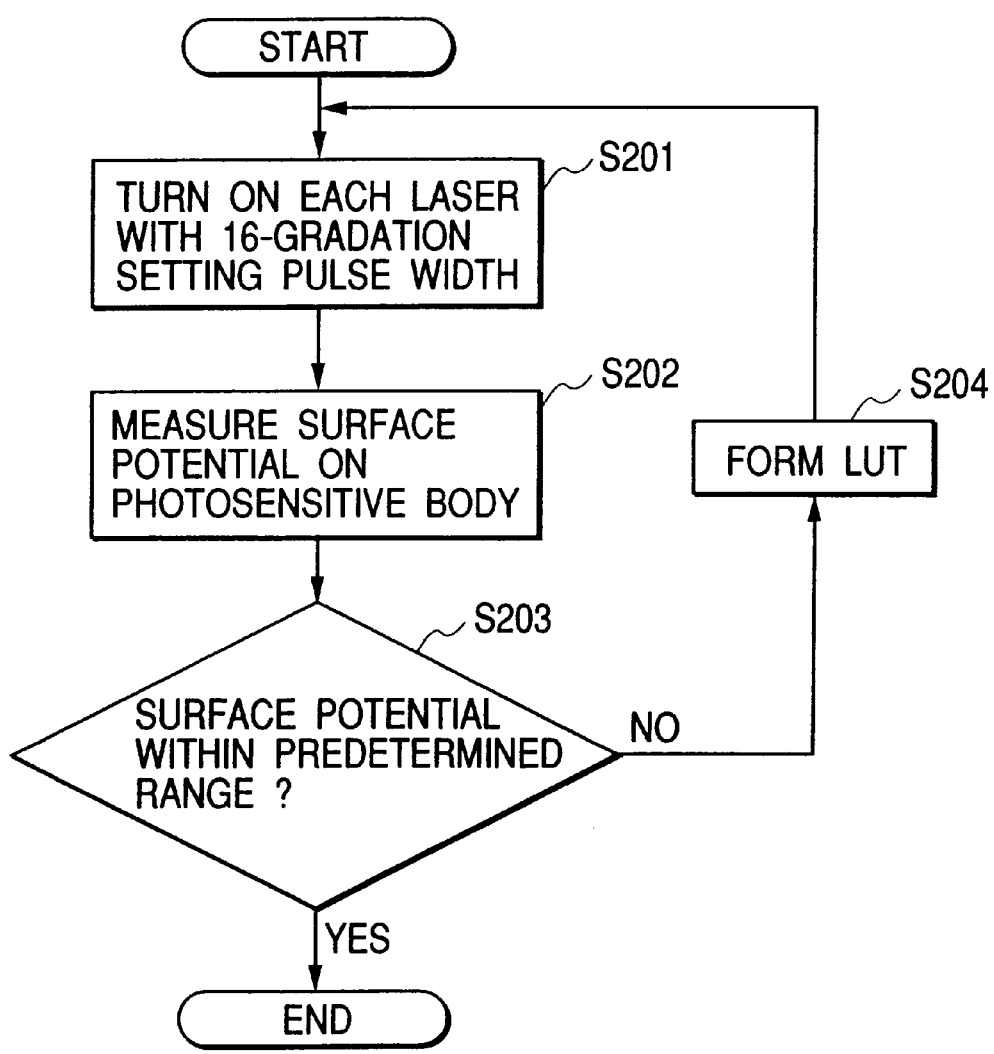
FIG. 10 is a flow chart showing a laser output control operation according to the second embodiment.

The above laser output control operation will be explained by using a flow chart shown in FIG. 10. FIG. 10 is the flow chart showing the laser output control operation according to the second embodiment. It should be noted that this operation is executed according to an instruction of the CPU 33, on the basis of a program stored in a not-shown ROM.

Initially, in a step S201, each of the semiconductor lasers 11a and 11b are turned on with the setting pulse width (first time initial setting pulse width) of 16 gradations. Then in a step S202, the surface potential of the photosensitive body 1 at that time is measured, and then it is judged in a step S203 whether or not the surface potential is within a predetermined range. If judged that the surface potential is within the predetermined range, the operation ends. On the other hand, if judged that the surface potential exceeds the predetermined range, the flow advances to a step S204. In the step S204, the LUT as shown in FIG. 7 is formed on the basis of the measured surface potential, and the flow returns to the step S201 to again turn on each laser with the pulse width according to the LUT. Such the operation is repeated until the surface potential comes to be within the predetermined range.

In the present embodiment, as the surface potential of the photosensitive body is measured, the pulse width of each laser is automatically adjusted, thereby controlling the laser output. Such control may be performed at a power-on time in a case where the image formation apparatus is frequently used.

Further, in case of controlling the laser output by automatically adjusting the pulse width of each laser, such control may be realized as a storage medium for storing a program to do it.

As above, in the image formation apparatus according to the present embodiment which includes the primary charger (i.e., charging means) 2 for uniformly charging the photosensitive body at a predetermined potential, the laser drive circuit (i.e., signal generation means) 15 for generating the signal proportional to the density of the image to be formed, the image exposure device (i.e., exposure means) 3 for simultaneously exposing the plural lines by scanning an image support body with the plural collected laser beams to be able to form the electrostatic latent image in accordance with the signal from the circuit 15, and the development device (i.e., development means) 4 for obtaining the visible image by adhering the charged toner to the electrostatic latent image, the surface potential on the photosensitive body with the plural-step pulse widths of the modulated signal of each laser is measured, and the plural-step pulse widths of each laser are controlled on the basis of the measured results. Thus, it is possible to optimally form the latent image by a simple and cost-effective method (or structure), thereby obtaining a high-quality image.

As explained above, according to the first and second embodiments, there is provided the measurement means for measuring the surface potential on the photosensitive body at the time when each of the plural laser beams is independently turned on for scanning, and the output of each of the plural laser beams is controlled based on the measured result such that the surface potential becomes the target potential. Therefore, the image deterioration due to the differences among the light quantities of the plural laser beams is correctly prevented by the simple and cost-effective structure, thereby obtaining the high-quality image.

Further, since the pulse width of the modulated signal of each of the plural laser beams is independently controlled such that the surface potential becomes the target potential, a fine and high-quality image can be obtained.

Further, since the surface potential on the photosensitive body with the plural-step pulse widths of the modulated signal of each laser is measured and based on the measured result the pulse width of the modulated signal of each laser is controlled, the fine and high-quality image can be obtained.

(Third Embodiment)

Hereinafter, the third embodiment will be explained in detail with reference to the attached drawings.

Figure 11:
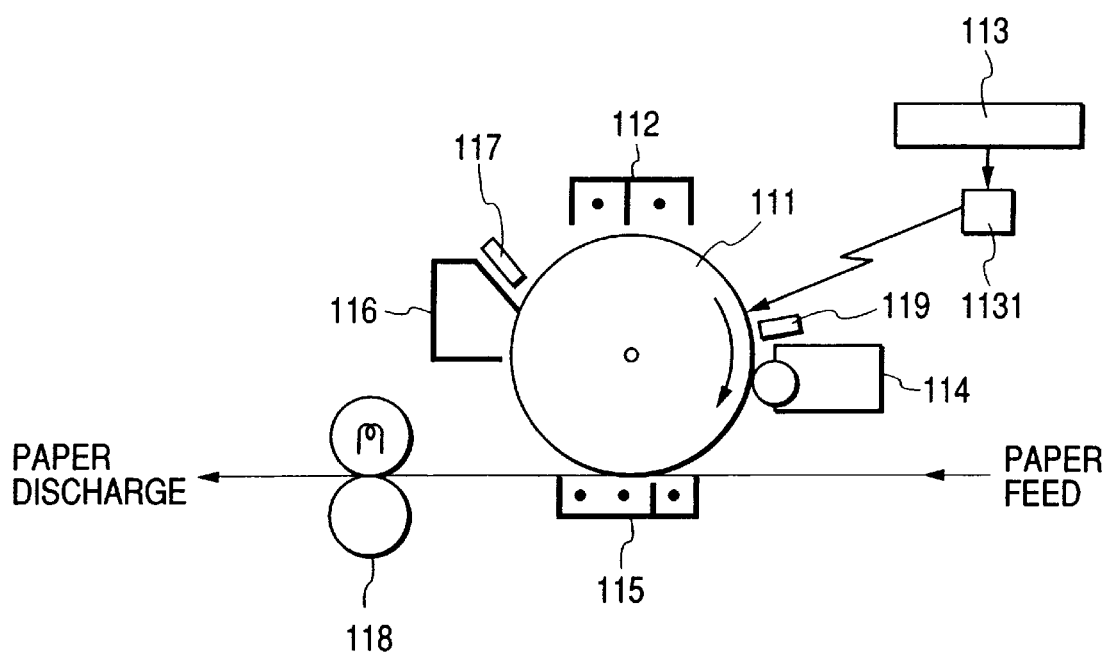
FIG. 11 is a view showing a structure of the main part of an image formation apparatus according to the third embodiment of the present invention.

FIG. 11 is a view showing a structure of the main part of an image formation apparatus according to the third embodiment of the present invention. In FIG. 11, numeral 111 denotes a photosensitive body which is mainly made of drum-type amorphous silicon and rotatively driven clockwise at 300 mm per second, and numeral 112 denotes a primary charger which charges the surface of the photosensitive body. Numeral 113 denotes a laser drive circuit which controls a laser beam modulated according to image information binarized at resolution 600 DPI through an error diffusion method by a not-shown image process unit, by supplying a current to irradiate the laser beam from a semiconductor laser 1131. The laser beam (or light) from the laser 1131 scans the surface of the photosensitive body along its axial direction by a not-shown polygonal mirror. If a development device 114 adheres toner to the portion exposed by the laser 1131, a latent image is visualized. Such a visualized toner image is transferred onto a sheet member by a transfer and separation device 115. The toner image transferred onto the sheet member is heated, pressed and fixed thereto by a fixing device 118. Numeral 116 denotes a cleaning device which collects not-transferred toner on the photosensitive body. The remaining electrostatic latent image on the photosensitive body is eliminated by light irradiation with a pre-exposure device 117. Numeral 119 denotes a surface potential sensor which detects a photosensitive body surface potential in the vicinity of a development position. It is assumed that following surface potential values are all measured by the sensor 119. Further, it is assumed that the photosensitive body surface potential in the vicinity of the development device 114 at a time when no exposure is performed by the laser 1131 is Vd, the photosensitive body surface potential corresponding to a solid black portion (i.e., image area) or the potential at a time when the laser 1131 is completely turned on is Vl, and the photosensitive body surface potential corresponding to a solid white portion (i.e., non-image area) or the potential at a time when a current lower than that to expose the solid black portion is supplied to the laser 1131 is Vw. The current value at this time is Id. In the image formation apparatus according to the present embodiment, the target value of Vw is set to 400V, and the target value of Vl is set to 50V.

Figure 12:
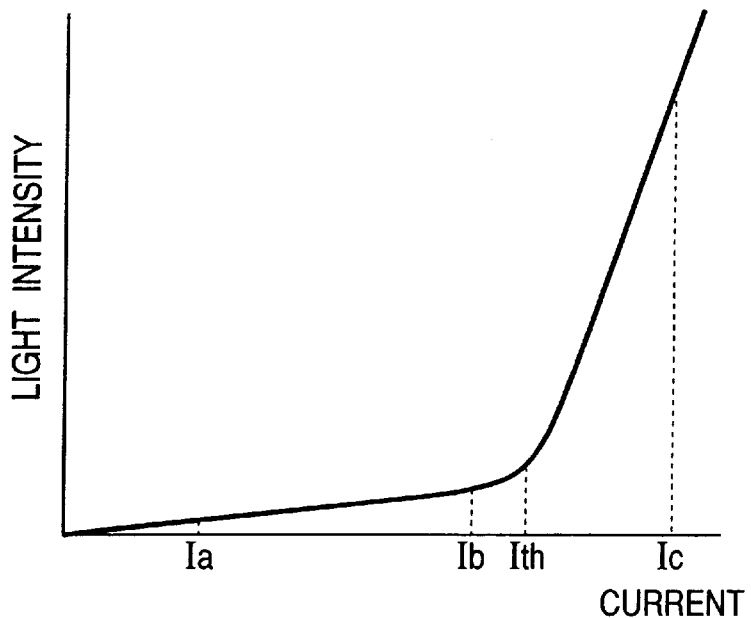
FIG. 12 is a view showing typical characteristics of a current and light intensity in a semiconductor laser.
Figure 13:
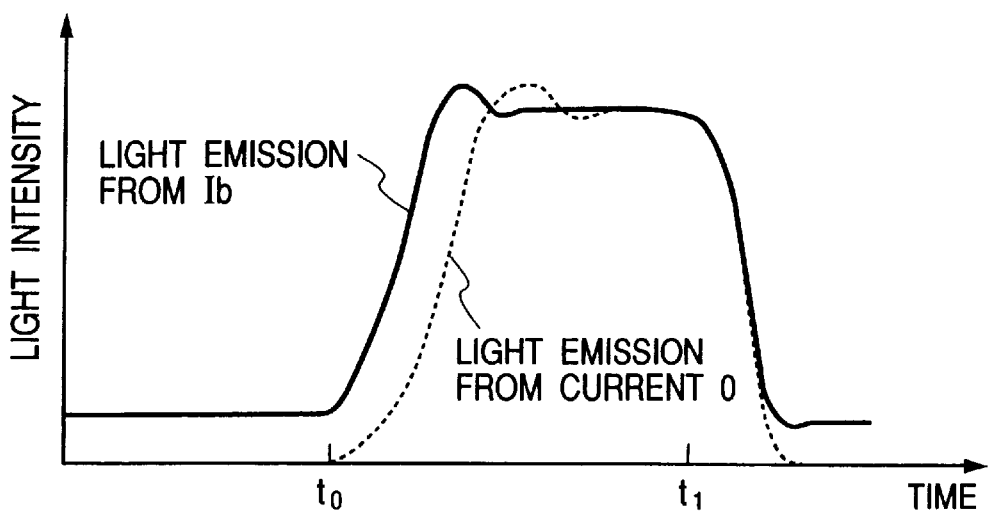
FIG. 13 is a view showing a time response characteristic obtained in case of causing the semiconductor laser to perform beam emission of one pixel.
Figure 14:
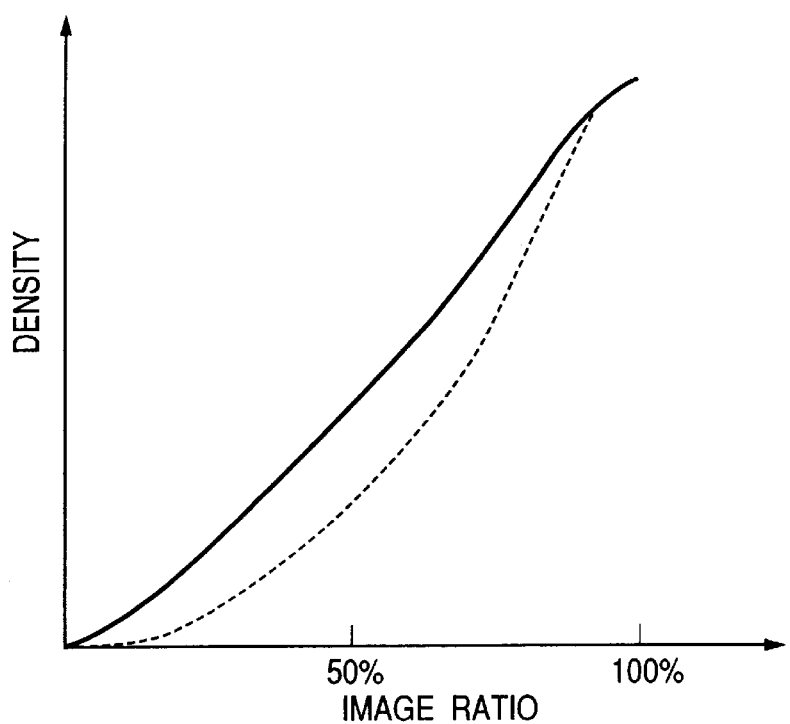
FIG. 14 is a view showing characteristics (i.e., printer characteristic) of image ratio and density.

As shown in FIG. 12, generally a current-light intensity characteristic of the semiconductor laser abruptly changes at a certain threshold Ith. That is, at the current quantity equal to or larger than Ith, laser resonance occurs if the current value increases, thereby generating the laser beam. On the other hand, at the current quantity lower than Ith, laser resonance does not occur, only lighting due to coupling of excited electrons occurs. FIG. 13 schematically shows a start characteristic of light intensity at a time when the current flows in the laser for about 15 ns corresponding to one pixel, i.e., when the current of Ic in FIG. 12 flows in the laser from a time t0 to a time t1. In FIG. 13, the solid line indicates the start characteristic in a case where Id is set to Ib in FIG. 12, and the dotted line indicates the start characteristic from Id=0. That is, the drawing indicates that the start response can increase if Id is set to Ib being approximately to Ith. FIG. 14 shows printer characteristics in cases of the above solid line and the dotted line. In FIG. 14, the solid line indicates the printer characteristic in a case where the potential at a time when the current Id=Ib flows is set to Vw=400V, and the dotted line indicates the printer characteristic in a case where the potential at the current value 0 (i.e., Id=0) is set to Vw=400V (=Vd). The light corresponding to the pattern image binarized in the error diffusion method is subjected to the image exposure. As shown in FIG. 14, if the laser start response is poor, reproducibility of dots to be printed deteriorates in the printer characteristic, whereby reproducibility of highlight also deteriorates, and a halftone area of the actual image on the transfer sheet member is viewed as relatively rough image. Further, if Id is Ia or so shown in FIG. 12, i.e., if Id is the current value remarkably lower than Ith, the result has been that the printer characteristic is substantially the same as that in case of Id=0. That is, it is better to previously set the current which is very closely approximate to Ith in the non-image area, to Id. However, there is dispersion in laser characteristics, and there is dispersion also in the laser drive circuits controlling the currents to be supplied to the laser. Therefore, if the laser current value is determined as one value, a certain apparatus emits the laser beam even at the solid white portion, and in another certain apparatus the laser start speed is delayed. They finally cause dispersion in the printer characteristics. However, even if the dispersion in every laser start characteristic is measured by observing its waveform with an oscilloscope or the like to adjust the current value, it causes increases in cost and manufacturing time.

Figure 15:
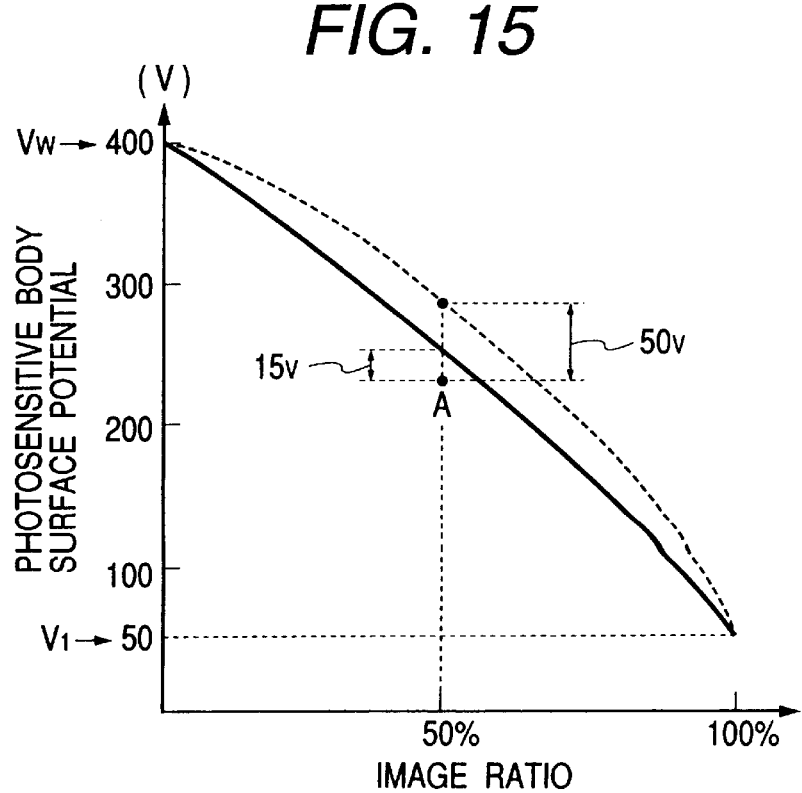
FIG. 15 is a view showing relation between the image ratio and a photosensitive body surface potential.
Figure 16:
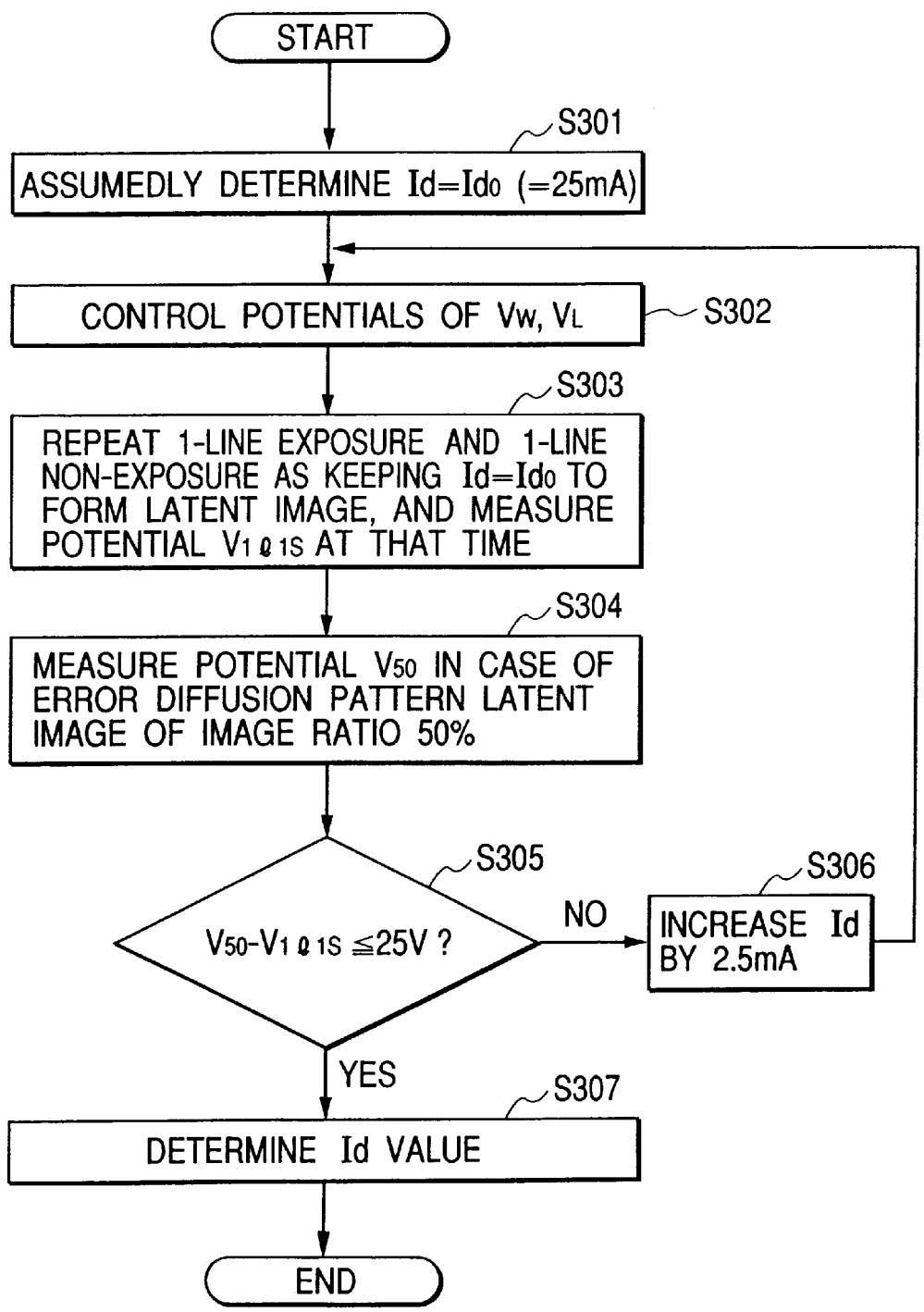
FIG. 16 is a flow chart showing an Id adjustment method.

Hereinafter, the laser start speed adjusting method according to the present embodiment will be explained. FIG. 15 shows relation between an exposure quantity and a photosensitive body surface potential posterior to the exposure. In FIG. 15, the solid line indicates the case where the potential at a time when the current Id=Ib flows is set to Vw=400V, and the dotted line indicates the case where the potential at the current Id=0 flowing is set to Vw=400V (=Vd) (VL=50V in both cases). The light corresponding to the pattern image binarized in the error diffusion method is subjected to the image exposure. The black dot in FIG. 15 indicates the potential in a case where one-line exposure and one-line non-exposure are repeated in a laser scanning direction. The one-line exposure and one-line non-exposure correspond to an image ratio 50%, and the exposure continues for one scanning at the time of exposure, whereby there is no influence due to the laser start. On the other hand, in case of the dotted line, since the laser start response is poor, a decrease in quantity of the surface potential is smaller than that of the solid line in a halftone area in which image ratio is about 50%: At the image ratio 50%, the potential indicated by the dotted line is higher than that indicated by the black dot by about 50V, but the potential indicated by the solid line is merely higher than that indicated by the black dot only by about 15V. As a result of experience, in the system of the present embodiment, if the difference between the potential at the black dot and the potential at the image ratio 25% is equal to or smaller than about 25V, the printer characteristic is stable in the highlight portion, whereby it was judged that no problem occurs in the actual image. In the present embodiment, such a printer characteristic is used as a parameter to adjust the current value Id flowing in the laser as shown in FIG. 16.

Figure 17:
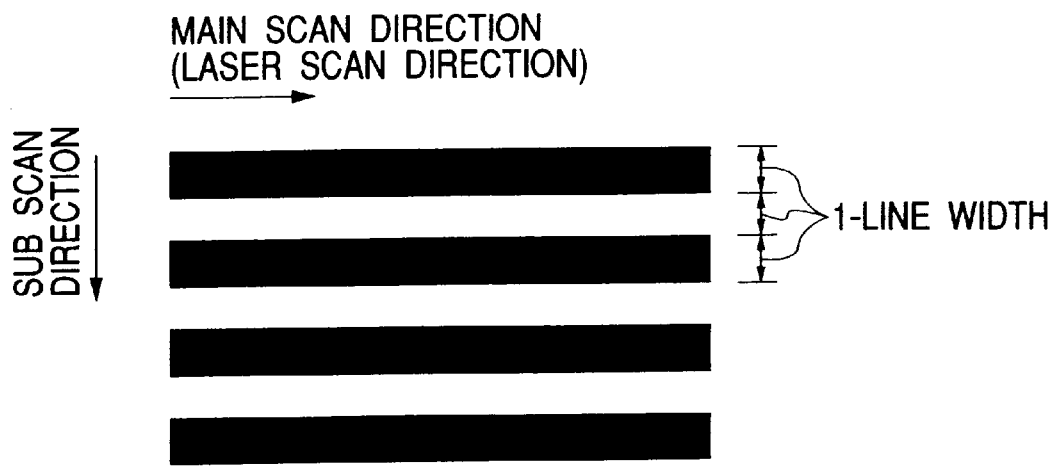
FIG. 17 is a view showing an example of an image pattern which is difficult to be influenced by a laser start characteristic.
Figure 18:
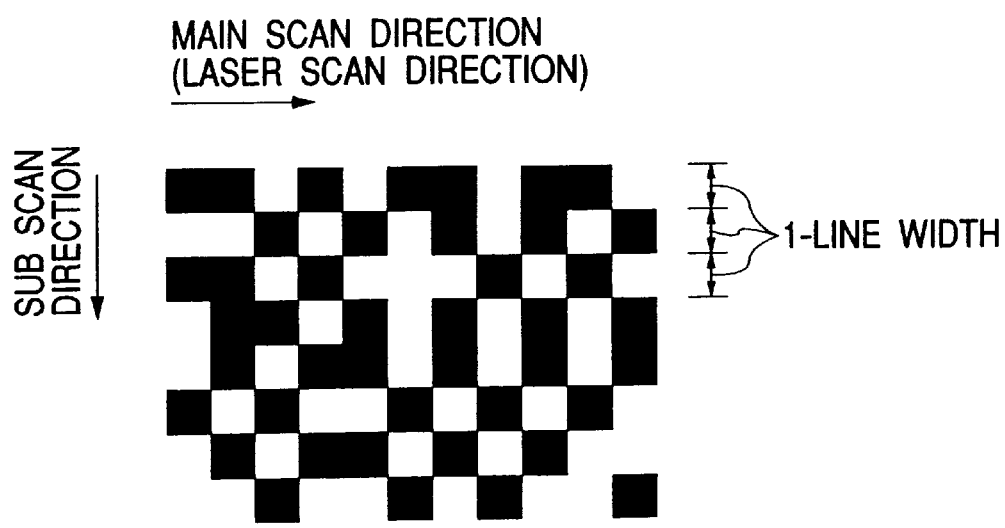
FIG. 18 is a view showing an example of an image pattern which is easy to be influenced by the laser start characteristic.

Initially, in a step S301, the value lower than the value of typical Ith of the laser is set to a predetermined current value Id0. Then, in a step S302, the potential control is performed for Vw and VL in the state of Id=Id0. In the present embodiment, since the average value of Ith is 35 mA or so, Id0 is set to 25 mA. However, Id0 may be determined according to a used laser type. Generally, the current flow in the primary charger 112, the voltage to be applied to a grid, and the like are controlled for the control of Vw, and a current quantity to be supplied to the laser at the laser emission time is controlled for the control of VL. However, details of these operations are omitted. If the potential controls ends, the flow advances to a step S303 to repeat the one-line exposure and one-line non-exposure in the laser scanning direction, thereby forming the electrostatic latent image in which a pattern is not influenced by the laser start characteristic as shown in FIG. 17. In the drawing, although the electrostatic latent image is represented by black and white dots as a matter of convenience for explanation, it is obviously understood an such that image is actually invisible. A potential V111s of this electrostatic latent image is measured. Subsequently, the flow advances to a step S304 to form the latent image of which image pattern is easy to be influenced by the laser start characteristic. As such image pattern, there is the pattern which is binarized in the error diffusion method such that the image ratio becomes 50%. Then a potential V50 is measured, and it is judged in a step S305 whether or not the value of (V50−V111s) is appropriate, i.e., equal to or lower than 25V. If judged that the value is equal to or lower than 25V, the flow advances to a step S307 to determine such a value to Id at that time. On the other hand, if judged that the value is not equal to or lower than 25V, the flow advances to a step S306 to add 2.5 mA to Id and repeat the potential control in the step S302. Then the above operation is repeated until the value of (V50−V111s) becomes equal to or lower than 25V.

In the present embodiment, the predetermined current value Id0 is given as 25V. However, a value inherent to the apparatus may be set according to the printer characteristic and the like. It should be noted that a not-shown control unit generates the image patterns, judges the measured results of the potentials, and controls the adjustment. Further, in the present embodiment, although the above-described steps are all executed manually, it is better to automate the adjustment of Id by a processor or the like.

As explained above, the image pattern difficult to be influenced by the laser start characteristic and the image pattern easy to be influenced by the laser start characteristic are formed respectively, and the surface potentials of the formed image patterns are respectively measured, whereby Id is controlled according to the measured results. Thus, it is possible to adjust or control the laser start speed without any dispersion, so that it is possible to prevent deterioration of the highlight reproducibility and the fine line reproducibility, i.e., deterioration of the printer characteristics due to lowering of the laser start speed.

Figure 19:
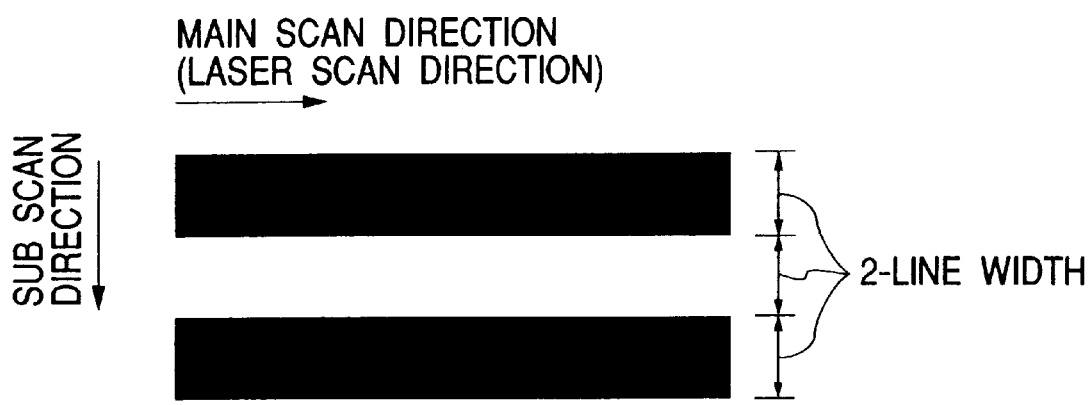
FIG. 19 is a view showing an example of an image pattern which is difficult to be influenced by the laser start characteristic.
Figure 20:
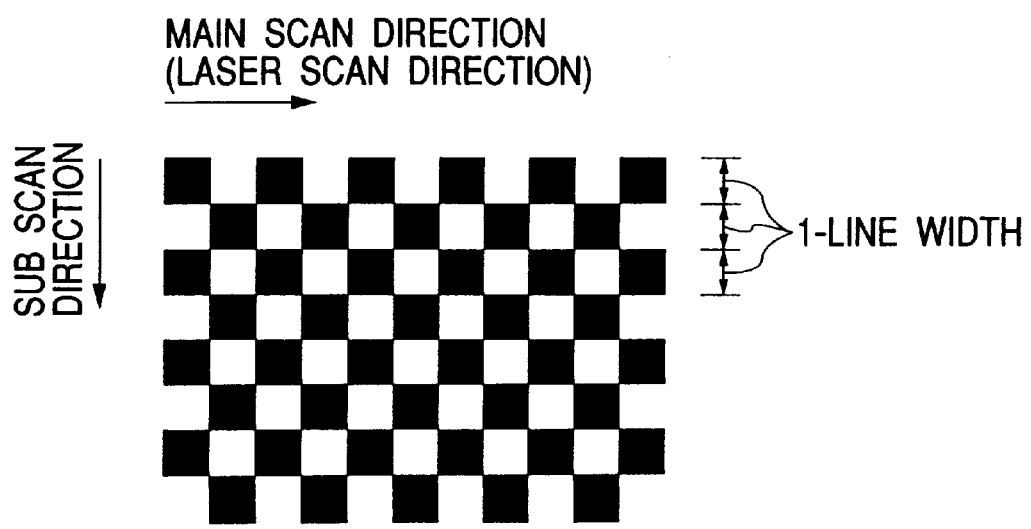
FIG. 20 is a view showing an example of an image pattern which is easy to be influenced by the laser start characteristic.

In the present embodiment, the potential at the time when the one-line exposure and one-line non-exposure in the laser scanning direction is repeated is compared with the potential of the error diffusion pattern of which image ratio is 50%. However, as the former potential, even in a case where the potential at the time when two-line exposure and two-line non-exposure in the laser scanning direction is repeated as shown in FIG. 19 is used, such the potential may be subjected to the comparison if this pattern is difficult to be influenced by the laser start. Further, as the latter potential, even in a case where such a pattern as shown in FIG. 20 including checkerwise-arranged dots is used and the one-line exposure and one-line non-exposure in the sub scanning direction is repeated, such a pattern may be used if its image ratio is 50% or so and this is easily influenced by the laser start.

Further, it is unnecessary to set each of the above two image patterns to have the image ratio 50%. Namely, if the image ratios of both the image patterns are identical with each other, the image pattern having another image ratio may be used. For example, in a case where an organic photosensitive body or the like having a relation between an exposure quantity and a surface potential of the photosensitive body different from that in the present embodiment is used, it is possible to determine Id from the difference between a potential obtained by repeating one-line exposure and three-line non-exposure in the laser scanning direction and a potential obtained by repeating one-line exposure and three-line non-exposure in the sub scanning direction.

Further, in case of measuring the result of the electrostatic latent image formation, the example that the surface potential on the photosensitive body prior to the development is measured has been explained. However, it is possible to measure the density of the visible image posterior to the development.

Further, in the present embodiment, the example in which the drive current at no laser beam emission time is adjusted according to the measured results concerning the above two image patterns has been explained. However, the present invention is not limited to this. That is, it is possible to judge based on such measured results whether or not the current supplied at the no laser beam emission time is adequate, and to use the judged result as the material for judging whether or not such current adjustment is necessary in a product quality proof step executed in a factory or judging whether or not shipment of products is thus possible.

Further, in the present embodiment, the example in which the bias current Id to be supplied to the semiconductor laser is adjusted on the basis of the measured result of the potential has been explained. However, the present invention is not limited to this. That is, it is possible to set a laser drive condition or an image formation condition on the basis of the measured result of the potential.

Further, in the present embodiment, the example wherein the semiconductor laser for emitting the single light beam has been explained. However, the present invention is not limited to this. That is, like the first and second embodiments, it is possible to use a light source for emitting plural light beams.

As described above, according to the present embodiment, it is possible to lower image deterioration due to the laser start characteristic as much as possible. Especially, it is possible to adjust the laser drive current to realize high-speed image formation without degrading highlight reproducibility and fine line reproducibility.

Further, it is possible to judge whether or not the drive current supplied at the no laser beam emission time has a value which invites the image deterioration due to the laser start characteristic.

In the above first to third embodiments, the semiconductor laser has been explained as the example of the light source for emitting a light beam. However, the present invention is not limited to this. That is, it is possible to use various light sources such as a light emission diode and the like.

Although the present invention has been explained with reference to several preferred embodiments, the present invention is not limited to the structures of these embodiments. That is, various modifications and changes are possible in the present invention without departing from the spirit and scope of the invention set forth in attached claims.

What is claimed is:

1. An image formation apparatus which irradiates a light beam onto a photosensitive body to form an image on the photosensitive body, comprising:

emission means for emitting the light beam modulated according to image information;

first means for causing said emission means to form an image pattern which is difficult to be influenced by a rising characteristic of said emission means;

second means for causing said emission means to form an image pattern which is easy to be influenced by the rising characteristic of said emission means;

measurement means for respectively measuring the image patterns formed by said first means and said second means; and control means for controlling image formation conditions according to the respective measured results of said measurement means.

2. An apparatus according to claim 1, wherein said measurement means uses a sensor to measure a potential on the photosensitive body.

3. An apparatus according to claim 1, wherein said second means forms the image pattern which represents repetition of lines continuous in a light beam scanning direction.

4. An apparatus according to claim 1, wherein said control means controls a current supplied to said emission means, on the basis of the measured result of said measurement means.

5. An apparatus according to claim 4, wherein said control means controls the current supplied at no beam emission time of said emission means, on the basis of the measured result of said measurement means.

6. A control method of an image formation apparatus which irradiates a light beam onto a photosensitive body to form an image on the photosensitive body, said method comprising:

a first step of forming, by using the light beam, an image pattern which is difficult to be influenced by a rising characteristic of the light beam;

a second step of forming, by using the light beam, an image pattern which is easy to be influenced by the rising characteristic of the light beam;

a measurement step of respectively measuring the image patterns formed in said first step and said second step; and a control step of controlling image formation conditions according to the respective measured results in said measurement step.

7. A method according to claim 6, wherein said measurement step uses a sensor to measure a potential on the photosensitive body.

8. A method according to claim 6, wherein said second step forms the image pattern which represents repetition of lines continuous in a light beam scanning direction.

9. A method according to claim 6, wherein said control step controls a current supplied to a source of the light beam, on the basis of the measured result.

10. A method according to claim 9, wherein said control step controls the current supplied at no beam emission time, on the basis of the measured result.

11. A control method of an image formation apparatus which irradiates a light beam onto a photosensitive body to form an image on the photosensitive body, said method comprising:

a first step of forming, by using the light beam, an image pattern which is difficult to be influenced by a rising characteristic of the light beam;

a second step of forming, by using the light beam, an image pattern which is easy to be influenced by the rising characteristic of the light beam; and a measurement step of respectively measuring the image patterns formed in said first step and said second step.

* * * * *